(12) United States Patent
Park et al.

(10) Patent No.: US 8,755,786 B2
(45) Date of Patent: Jun. 17, 2014

(54) ROUTING APPARATUS AND METHOD FOR MULTI-HOP CELLULAR SYSTEMS

(75) Inventors: Yongsuk Park, Seoul (KR); Eun Sun Jung, Seoul (KR); Jong Ho Bang, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1540 days.

(21) Appl. No.: 11/898,758

(22) Filed: Sep. 14, 2007

(65) Prior Publication Data

US 2008/0085702 A1    Apr. 10, 2008

(51) Int. Cl.
*H04W 4/00*    (2009.01)

(52) U.S. Cl.
USPC .......................... 455/422.1; 370/338; 370/328

(58) Field of Classification Search
USPC ......... 370/331, 248, 252, 351, 338, 315, 328, 370/445, 337, 349, 235; 455/445, 453, 447
See application file for complete search history.

(56) References Cited

U.S. PATENT DOCUMENTS

| | | | |
|---|---|---|---|
| 2004/0010617 A1* | 1/2004 | Akahane et al. | 709/243 |
| 2004/0213198 A1* | 10/2004 | Mahmood et al. | 370/349 |
| 2005/0185632 A1* | 8/2005 | Draves et al. | 370/351 |
| 2006/0165025 A1* | 7/2006 | Singh et al. | 370/315 |
| 2006/0268727 A1* | 11/2006 | Rangarajan et al. | 370/248 |
| 2007/0019593 A1* | 1/2007 | Sarkar | 370/338 |
| 2007/0041345 A1* | 2/2007 | Yarvis et al. | 370/331 |
| 2007/0195728 A1* | 8/2007 | Chen et al. | 370/328 |
| 2007/0206547 A1* | 9/2007 | Gong et al. | 370/338 |

* cited by examiner

*Primary Examiner* — Kiet Doan
(74) *Attorney, Agent, or Firm* — NSIP Law (57) ABSTRACT

A routing method in a multi-hop cellular system, the method including: maintaining a signal strength in each node included in the multi-hop cellular system; receiving, in at least one neighbor node, a route-request message broadcasted by a source node; dropping or re-broadcasting, by the at least one neighbor node, the route-request message based on a hop count and the signal strength; and storing, in a base station, the route-request message which is received via the at least one neighbor node, based on an elapsed time, or transmitting a route-reply message to the source node via an optimal path which is selected via the stored route-request message.

21 Claims, 8 Drawing Sheets

ROUTING APPARATUS AND METHOD FOR MULTI-HOP CELLULAR SYSTEMS

CROSS-REFERENCE TO RELATED APPLICATION

This application claims the benefit under 35 U.S.C. §119 (a) of Korean Patent Application No. 10-2006-0111112, filed on Nov. 10, 2006, in the Korean Intellectual Property Office, the entire disclosure of which is hereby incorporated by reference.

BACKGROUND OF THE INVENTION

1. Field of the Invention

The present invention relates to a routing apparatus and method in a multi-hop cellular system. More particularly, the present invention relates to a routing apparatus and method in a multi-hop cellular system which selects an optimal path from a plurality of possible paths through the nodes and to a base station based on the signal strength between each node and the base station, the nodes comprising mobile terminals within the multi-hop cellular system.

2. Description of Related Art

Figure 1:
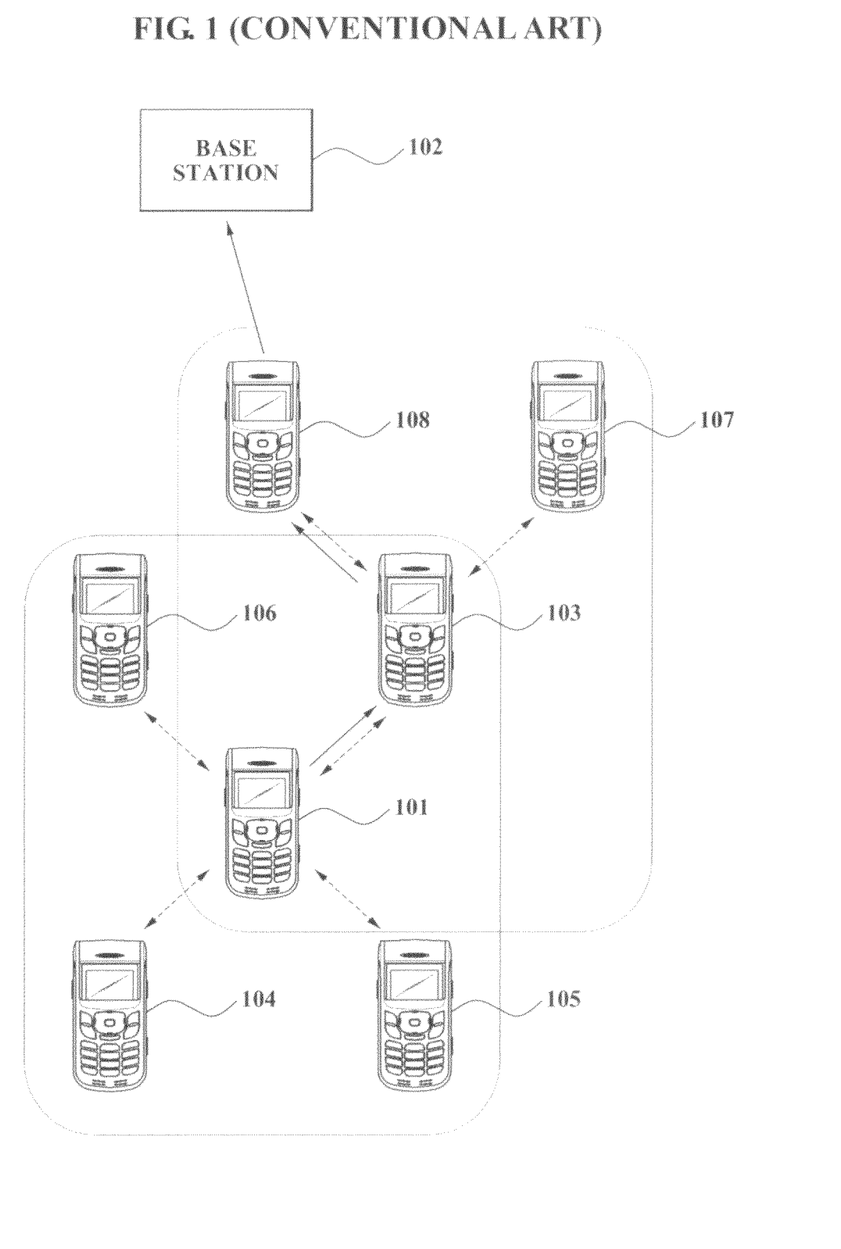
FIG. 1 is a diagram illustrating an example of a prior art routing method in a multi-hop cellular system.

In a routing method for finding a path between a base station and a mobile terminal in a multi-hop cellular system, only local information is typically used to find the path. Base stations select a route message which arrives first, and transmit a route response message via the path. FIG. 1 is a diagram illustrating an example of a prior art routing method in a multi-hop cellular system.

A mobile terminal 101 in a multi-hop cellular system finds another mobile terminal 103, which has the highest signal strength, among neighboring mobile terminals 103, 104, 105, and 106 in order to set a path between the mobile terminal 101 and a base station 102. In this instance, the mobile terminal 103 has the highest signal strength between each of the neighboring mobile terminals 103, 104, 105, and 106 and the base station 102. Based on this, the mobile terminal 101 selects the mobile terminal 103 as a subsequent hop.

The other mobile terminal 103 selects still another mobile terminal 108, which has the highest signal strength, among neighboring mobile terminals 101, 107, and 108 as a subsequent hop by using a same method. Accordingly, the other mobile terminal 103 may select a path between the base station 102 and the other mobile terminal 103.

However, in the prior art, only local information is used and a single path is maintained. Accordingly, global information is not used, and a plurality of paths are not compared to find an optimal path. Also, the amount of traffic in the network is higher since the conventional art is simply based on flooding.

Accordingly, there is a need for a routing apparatus and method in a multi-hop cellular system which selects an optimal path from a plurality of possible paths through the nodes and to a base station based on the signal strength between each node and the base station, the nodes comprising mobile terminals within the multi-hop cellular system.

SUMMARY OF THE INVENTION

Exemplary embodiments of the present invention address at least the above problems and/or disadvantages and provide at least the advantages described below. Accordingly, an aspect of exemplary embodiments of the present invention is to provide a routing apparatus and method.

Exemplary embodiments of the present invention also provide a routing apparatus and method in a multi-hop cellular system which find at least one path between a node, i.e. a mobile terminal, and a base station based on a signal strength and a hop count, and select an optimal path of the at least one path in the base station.

Exemplary embodiments of the present invention also provide a routing apparatus and method in a multi-hop cellular system which drop a route-request message, which is transmitted by broadcasting, according to a predetermined standard based on signal strength and hop count to thereby reduce flooding.

Exemplary embodiments of the present invention also provide a routing apparatus and method in a multi-hop cellular system which have a different path according to a different parameter value such as a signal to noise plus interference ratio (SNIR) or select another path according to a battery status by using a method of selecting a single path of a plurality of paths to thereby obtain flexibility in selecting a performance metric.

According to exemplary embodiments of the present invention, a routing method in a multi-hop cellular system is provided, the method including: maintaining a signal strength in each node of a multi-hop cellular system; receiving, in at least one neighbor node, a route-request message broadcasted by a source node; dropping or re-broadcasting, by the at least one neighbor node, the route-request message based on a hop count and the signal strength; and storing, in a base station, the route-request message which is received via the at least one neighbor node, based on an elapsed time, or transmitting a route-reply message to the source node via an optimal path which is selected via the stored route-request message.

According to an aspect of the present invention, the signal strength corresponds to a signal strength level from the each node to the base station.

According to another aspect of the present invention, the route-request message comprises a source address of the source node, an address of a previous node, the hop count, and the signal strength corresponding to a signal strength level from the node to the base station.

According to another aspect of the present invention, the dropping or re-broadcasting includes: setting the hop count and the signal strength included in the route-request message as a first hop count and a first signal strength, respectively; confirming whether the route-request message is a first route-request message transmitted from the source node; setting a hop count of the previously received route-request message and a signal strength of the neighbor node as a second hop count and a second signal strength, respectively, when the route-request message is different from the first route-request message, and setting the second hop count to infinity when the route-request message is the first route-request message; confirming whether the first hop count is less than the second hop count and the first signal strength is less than the second signal strength included in the neighbor node; and updating the second hop count and the first signal strength and re-broadcasting the route-request message after increasing and updating the first hop count, when the first hop count is less than the second hop count and the first signal strength is less than the second signal strength included in the neighbor node, and dropping the route-request message when the first hop count is greater than or equal to the second hop count and the first signal strength is greater than or equal to the second signal strength included in the neighbor node.

According to another exemplary embodiment of the present invention, a multi-hop cellular system includes: a source node for broadcasting a route-request message to at least one neighbor node; the at least one neighbor node for dropping or re-broadcasting the route-request message based on a hop count and a signal strength included in the route-request message; and a base station for storing the route-request message, which is received via the at least one neighbor node, based on an elapsed time, or for transmitting a route-reply message to the source node via an optimal path which is selected via the stored route-request message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As described above, the present invention relates to a routing method in a multi-hop cellular system which finds at least one path by using a route-request message broadcasted in a source node to select an optimal path by using a weight factor predetermined in a base station.

In this instance, while searching for the at least one path and selecting the optimal path, a signal strength between the base station and each node, i.e. each mobile terminal included in the multi-hop cellular system, and a hop count of the route-request message are used.

Figure 2:
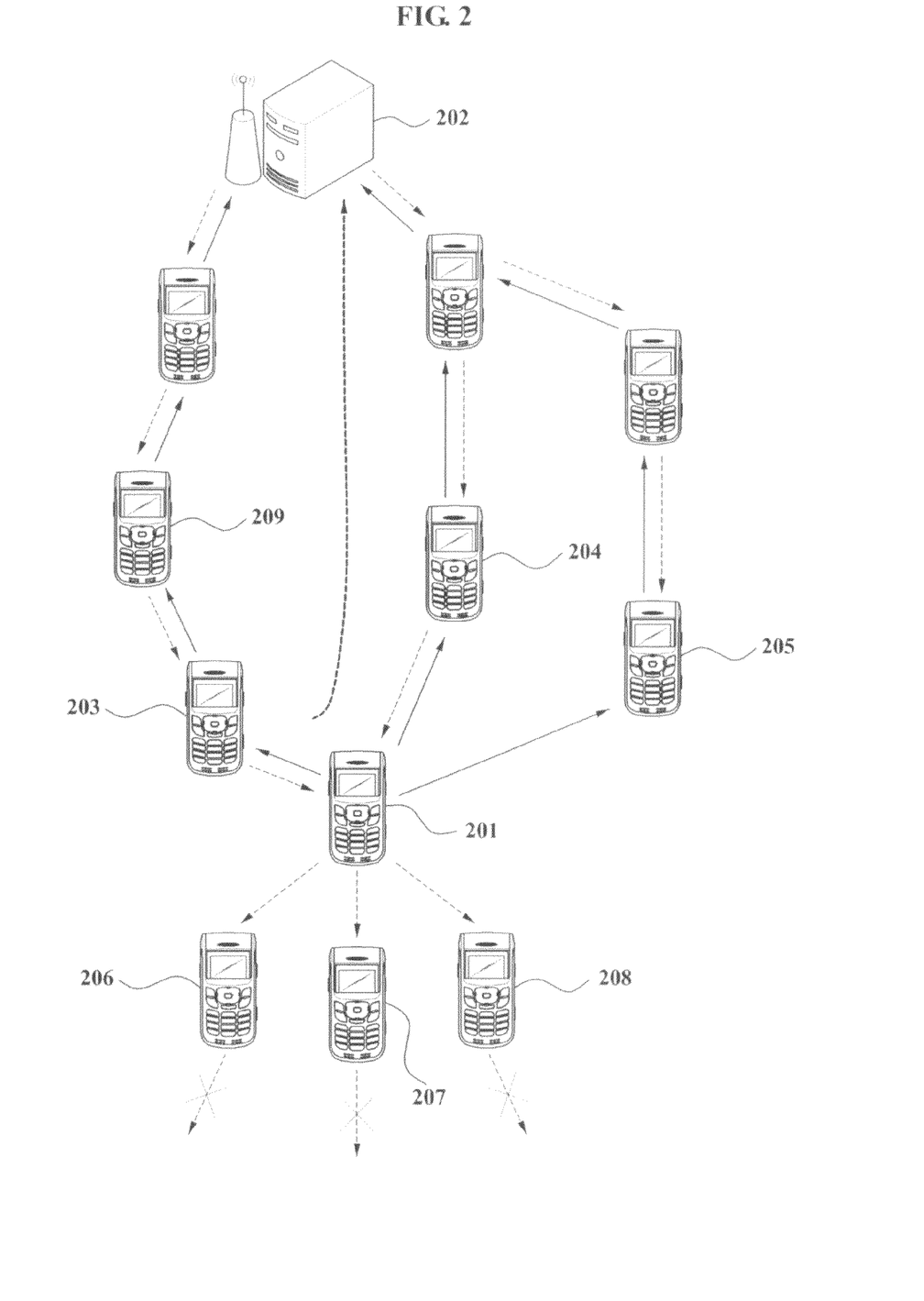
FIG. 2 is a diagram illustrating a multi-hop cellular system which may find at least one path.

FIG. 2 is a diagram illustrating a multi-hop cellular system which may find at least one path.

In a multi-hop cellular system according to an exemplary embodiment of the invention, a source node 201 broadcasts a route-request message to neighbor nodes 203, 204, 205, 206, 207, and 208 in order to find a path to a base station 202. In this instance, each of the neighbor nodes 203, 204, 205, 206, 207, and 208 extract a first hop count and a first signal strength in the received route-request message. Also, each of the neighbor nodes 203, 204, 205, 206, 207, and 208 compares the first hop count and the first signal strength with a second hop count and a second signal strength, and thereby may drop or rebroadcast the route-request message depending upon the result of the comparison. In this instance, the second hop count and the second signal strength are included in the neighbor nodes 203, 204, 205, 206, 207, and 208.

When the first hop count is less than the second hop count and the first signal strength is less than the second signal strength, the route-request message may be re-broadcasted. When the first hop count is greater than or equal to the second hop count and the first signal strength is greater than or equal to the second signal strength, the route-request message may be dropped.

Dropping of the route-request message operates to reduce traffic and improve performance by reducing the flooding which would otherwise occur in the network.

In an exemplary embodiment of the invention, when the signal strength is determined according to only distance and excluding all other factors, the neighbor nodes 203, 204, and 205 rebroadcast the route-request message since the first signal strength is less than the second signal strength, i.e. each signal strength of the neighbor nodes 203, 204, and 205 is greater than a signal strength of the source node 201. In this embodiment, the neighbor nodes 203, 204, and 205 are closer to the base station 202 than the source node 201.

However, the neighbor nodes 206, 207, and 208, which are relatively further away from the base station 202 than the source node 201, drop the route-request message since each signal strength of the neighbor nodes 206, 207, and 208 is less than the signal strength of the source node 201.

Also, the hop count may reduce flooding. In an exemplary embodiment of the invention, a neighbor node 209, which receives the route-request message re-broadcasted in the neighbor node 204, drops the route-request message since the hop count is identical in the neighbor nodes 204 and 209 with respect to the route-request message.

As the dropping and re-broadcasting are repeated, the base station 202 receives and stores the route-request message, and measures the elapsed time. The base station 202 stores the route-request message, which is received after the first transmitted route-request message, for a predetermined period of time. After the predetermined period of time, an optimal path of at least one path may be selected by using the stored route-request message.

Figure 3:
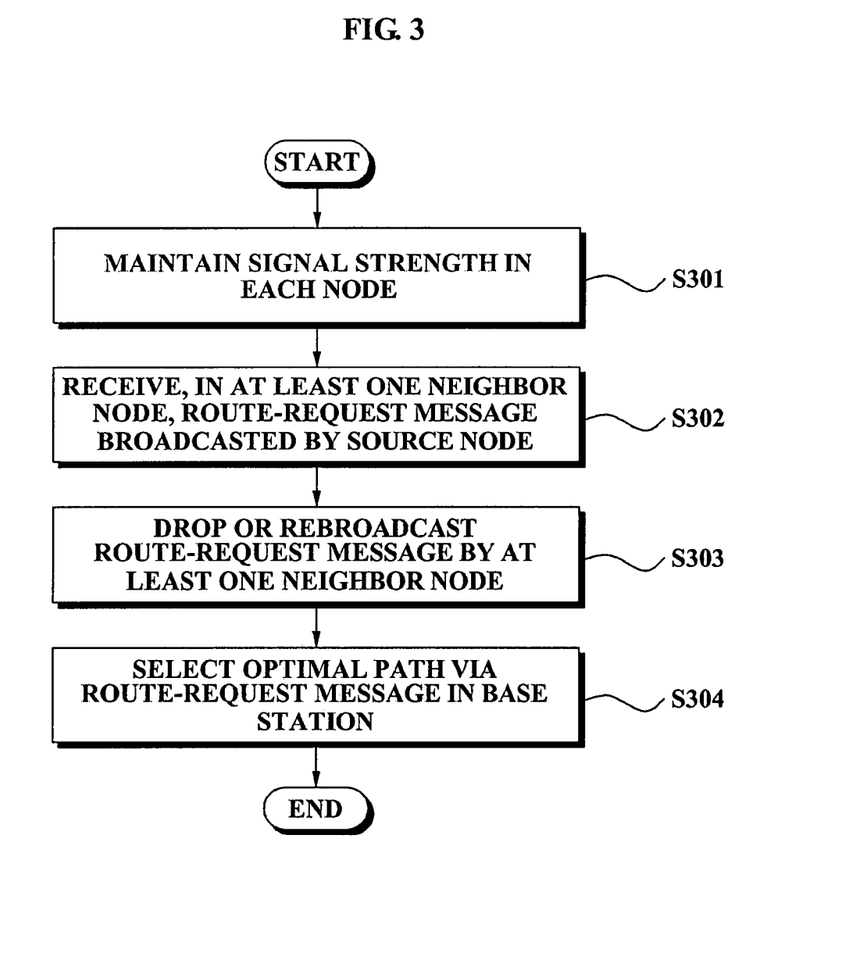
FIG. 3 is a flowchart illustrating a routing method in a multi-hop cellular system according to an exemplary embodiment of the present invention.

FIG. 3 is a flowchart illustrating a routing method in a multi-hop cellular system according to an exemplary embodiment of the present invention.

In operation S301, each node included in the multi-hop cellular system maintains a signal strength. Here, the signal strength corresponds to a signal strength level from the node to the base station.

In operation S302, at least one neighbor node existing around a source node receives a route-request message broadcasted in the source node. Here, the route-request message may include a source address of the source node, an address of a previous node, a hop count, and a signal strength corresponding to the signal strength level from the node to the base station.

Specifically, each of the nodes maintains the signal strength from the node to the base station. The node broadcasting the route-request message rewrites or updates the signal strength of the route-request message with the signal strength maintained in the node to thereby broadcast the signal strength maintained in the node.

In operation S303, the at least one neighbor node drops or rebroadcasts the route-request message based on the hop count and the signal strength. As described above, the dropping of the route-request message reduces flooding which would otherwise occur in a network to thereby reduce traffic and improve performance. Operation S303, i.e. determining the dropping or the re-broadcasting of the route-request message, is described in detail with reference to FIG. 4.

Also, another neighbor node, which receives the route-request message re-broadcasted in the neighbor node, may drop or rebroadcast the route-request message through operation S303. The route-request message may be transmitted to the base station through repeating the dropping and re-broadcasting.

In operation S304, the base station stores the route-request message, which is received via the neighbor node, based on an elapsed time, or transmits a route-reply message to the source node via an optimal path which is selected via the stored route-request message.

Specifically, the base station selects a single path from a plurality of paths, via the route-request message transmitted via the plurality of paths. Also, the base station may select another path according to a battery status or selectively determines a parameter value such as a signal to noise plus interference ratio (SNIR). Accordingly, flexibility in selecting a performance metric is obtained.

Operation S304, i.e. a method of selecting the optimal path in the base station is described in detail with reference to FIG. 5.

Figure 4:
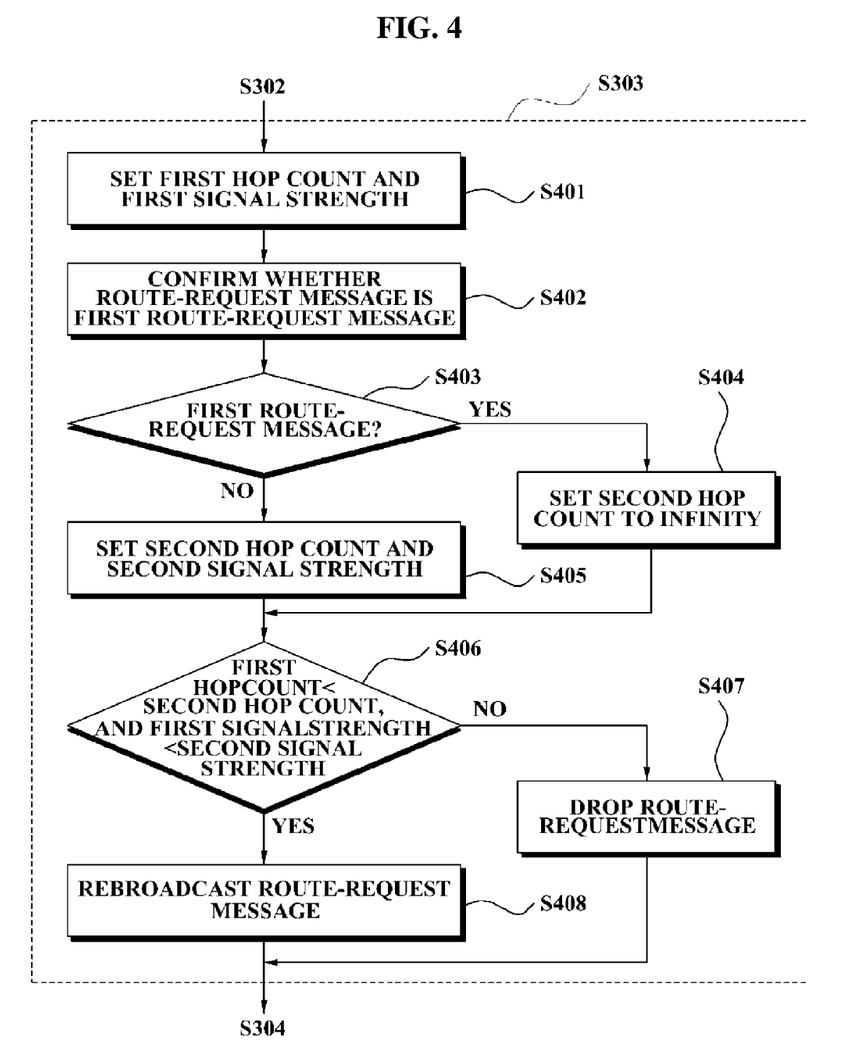
FIG. 4 is a flowchart illustrating a method of determining a dropping or re-broadcasting of a route-request message in a neighbor node in operation S303 of FIG. 3.

FIG. 4 is a flowchart illustrating a method of determining a dropping or re-broadcasting of a route-request message in a neighbor node in operation S303 of FIG. 3. As illustrated in FIG. 4, operations S401, S402, S403, S404, S405, S406, S407, and S408 may be included in operation S303 of FIG. 3, and performed.

In operation S401, the at least one neighbor node, which determines whether to drop or re-broadcast the route-request message, sets the hop count and the signal strength included in the route-request message as a first hop count and a first signal strength, respectively. Specifically, the neighbor node sets a signal strength of the source node, included in the route-request message, as the first signal strength. Also, the neighbor node sets the hop count, i.e. a number of times the route-request message uses the node, as the first hop count.

In operation S402, the neighbor node confirms whether the route-request message is a first route-request message transmitted from the source node. Specifically, as described in FIG. 2, the neighbor node, which has once received the route-request message, may again receive the route-request message from another neighbor node. Accordingly, the neighbor node may confirm whether the route-request message is the first route-request message.

As a result of performing operation S403, when the route-request message is the first route-request message, the neighbor node performs operation S404. When the route-request message is different from the first route-request message, the neighbor node performs operation S405.

In operation S404, the neighbor node sets a second hop count to infinity. Setting the second hop count to infinity prevents the first route-request message from being dropped by the hop count when comparing the first hop count with the second hop count. The second hop count, which is set to infinity, enables the first hop count to be set to be less than the second hop count at all times.

In operation S405, the neighbor node sets a hop count of a route-request message, which is received prior to the route-request message, and a signal strength of the neighbor node as the second hop count and a second signal strength, respectively. Specifically, when the route-request message is different from the first route-request message, the neighbor node compares the hop count of the previously received route-request message with the second hop count. Accordingly, unnecessary flooding is reduced. Also, unnecessary flooding may be reduced by comparing the signal strength of the neighbor node with the second signal strength.

In operation S406, the neighbor node confirms whether the first hop count is less than the second hop count and the first signal strength is less than the second signal strength included in the neighbor node. When the first hop count is greater than or equal to the second hop count and the first signal strength is greater than or equal to the second signal strength, the neighbor node performs operation S407. When the first hop count is less than the second hop count and the first signal strength is less than the second signal strength, the neighbor node performs operation S408.

In operation S407, the neighbor node drops the route-request message. Specifically, when the first hop count is greater than or equal to the second hop count, the route-request message is different from the route-request message of the source node. In this instance, the route-request message of the source node is first received in the neighbor node. That is, when the first hop count is greater than or equal to the second hop count, the route-request message corresponds to a route-request message passing through even more nodes than a previously transmitted route-request message. Accordingly, the neighbor node drops the route-request message.

Also, when the first signal strength is greater than the second signal strength, the second signal strength, i.e. the signal strength of the neighbor node, is less than or equal to the first signal strength, i.e. the signal strength of the source node. Accordingly, the neighbor node drops the route-request message.

In operation S408, the neighbor node updates the second hop count and the first signal strength and rebroadcasts the route-request message after increasing and updating the first hop count, when the first hop count is less than the second hop count and the first signal strength is less than the second signal strength included in the neighbor node. As described above, only the neighbor node, which has a lower hop count and a higher signal strength, re-broadcasts the route-request message. Accordingly, flooding of the multi-hop cellular system is reduced and performance is improved.

Figure 5:
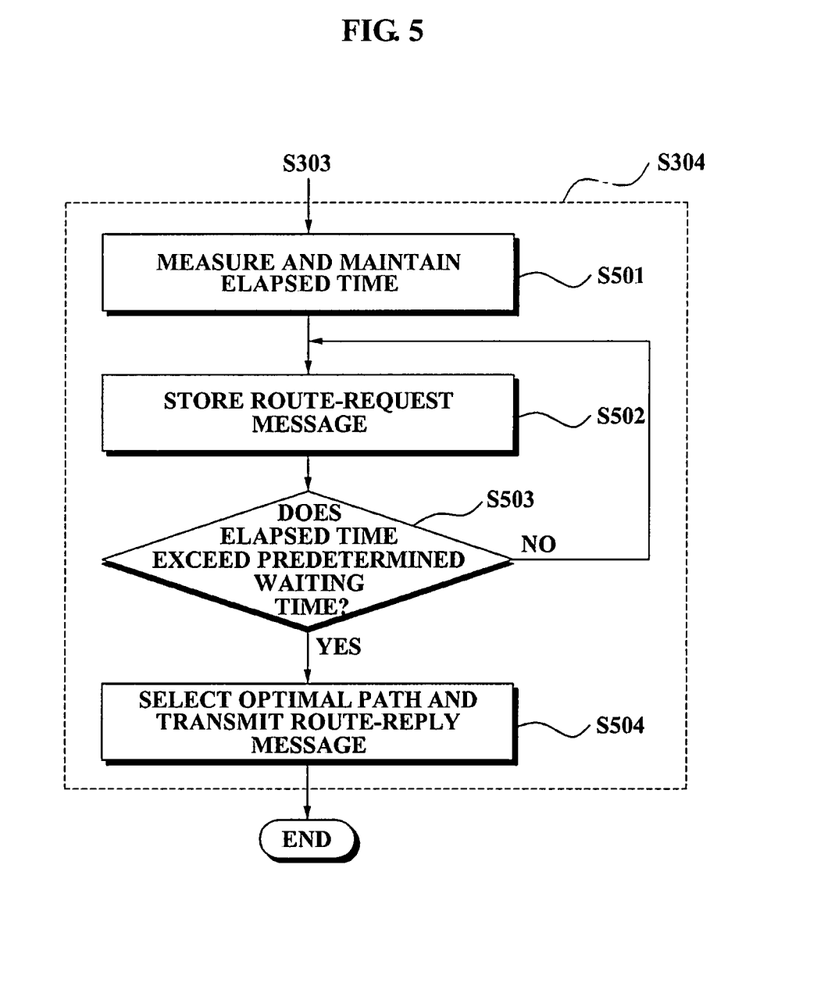
FIG. 5 is a flowchart illustrating a method of selecting an optimal path in a base station in operation S304 of FIG. 3.

FIG. 5 is a flowchart illustrating a method of selecting an optimal path in a base station in operation S304 of FIG. 3. As illustrated in FIG. 5, operations S501, S502, S503, and S504 may be included in operation S304 of FIG. 3, and performed.

In operation S501, the base station measures and maintains the elapsed time with respect to the route-request message which is first transmitted, from among the route-request message including the source address of the source node.

In operation S502, the base station stores the first transmitted route-request message until the elapsed time exceeds a predetermined waiting time.

In operation S503, the base station confirms whether the elapsed time exceeds the predetermined waiting time. When the elapsed time does not exceed the predetermined waiting time, the base station performs operation S502. When the elapsed time exceeds the predetermined waiting time, the base station performs operation S504.

Specifically, operations S501, S502, and S503 measure the elapsed time, and maintain the elapsed time until the elapsed time exceeds the predetermined waiting time. In this instance, the elapsed time corresponds to a period of time after the route-request message is first transmitted. Accordingly, through operations S501, S502, and S503, a plurality of paths may be found via the at least one route-request message broadcasted in the source node.

In operation S504, the base station selects the optimal path based on the stored route-request message, and transmits the route-reply message via the optimal path, when the elapsed time exceeds the predetermined waiting time. In this instance, the base station may select the optimal path by comparing the hop count included in the route-request message. For example, the base station may select the path having the smallest hop count as the optimal path.

Also, the base station updates a routing table included in the base station via the optimal path, and transmits the route-response message via the optimal path. Here, the routing table may include a destination address, a subsequent hop, and a most recent usage time. Also, the base station stores other paths in the routing table. The base station removes the path which is least recently used, based on the most recent usage time, when storage space with respect to the optimal path is insufficient.

As described with reference to FIGS. 3, 4, and 5, the routing method in the multi-hop cellular system according to an exemplary embodiment of the present invention may find at least one path between a node, i.e. a mobile terminal, and a base station, based on signal strength and hop count, select an optimal path of the at least one path in the base station, and drop a route-request message, which is transmitted by broadcasting, according to a predetermined standard based on the signal strength and the hop count. Thus, flooding is reduced.

Also, the routing method in a multi-hop cellular system may have a different parameter value such as an SNIR, or selects another path according to a battery status by using a method of selecting a path of a plurality of paths, to thereby obtain flexibility and offer a selection of performance metrics.

Figure 6:
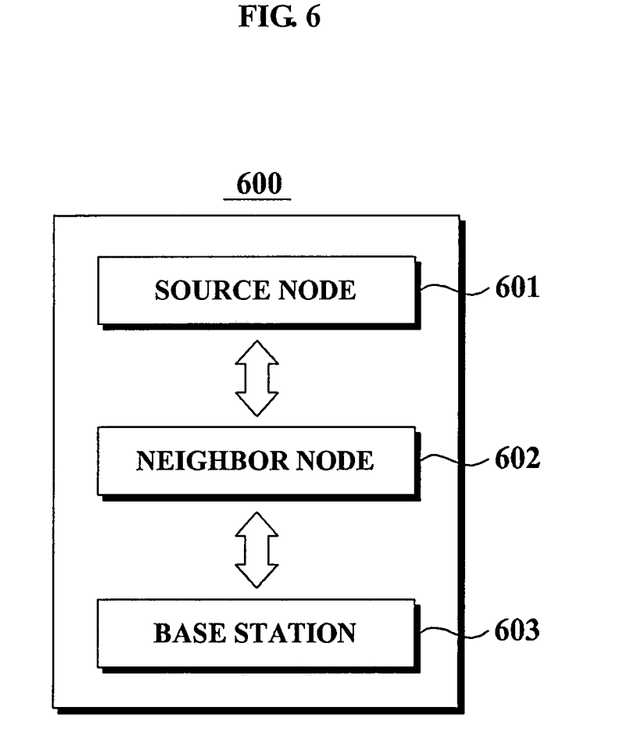
FIG. 6 is a block diagram illustrating a multi-hop cellular system according to another exemplary embodiment of the present invention.

FIG. 6 is a block diagram illustrating a multi-hop cellular system according to another exemplary embodiment of the present invention. As illustrated in FIG. 6, the multi-hop cellular system 600 includes a source node 601, a neighbor node 602, and a base station 603.

The source node 601 broadcasts a route-request message to at least one neighbor node 602. In this instance, the route-request message may include a source address of the source node 601, an address of a previous node, a hop count, and a signal strength corresponding to a signal strength level from the source node 601 to the base station 603. In this instance, all nodes included in the multi-hop cellular system 600 measure and maintain the signal strength, and the signal strength may include the signal strength, which is measured and maintained in the source node 601, in the route-request message.

The at least one neighbor node 602 drops or rebroadcasts the route-request message based on the hop count and the signal strength included in the route-request message. The dropping of the route-request message reduces flooding of the multi-hop cellular system 600 which is caused by the broadcasting to thereby improve performance. The at least one neighbor node 602 is described in detail with reference to FIG. 7.

The base station 603 stores the route-request message, which is received via the at least one neighbor node 602, based on an elapsed time, or transmits a route-reply message to the source node 601 via an optimal path which is selected via the stored route-request message. The base station 603, which selects the optimal path via the route-request message and transmits the route-reply message via the optimal path, is described in detail with reference to FIG. 8.

Figure 7:
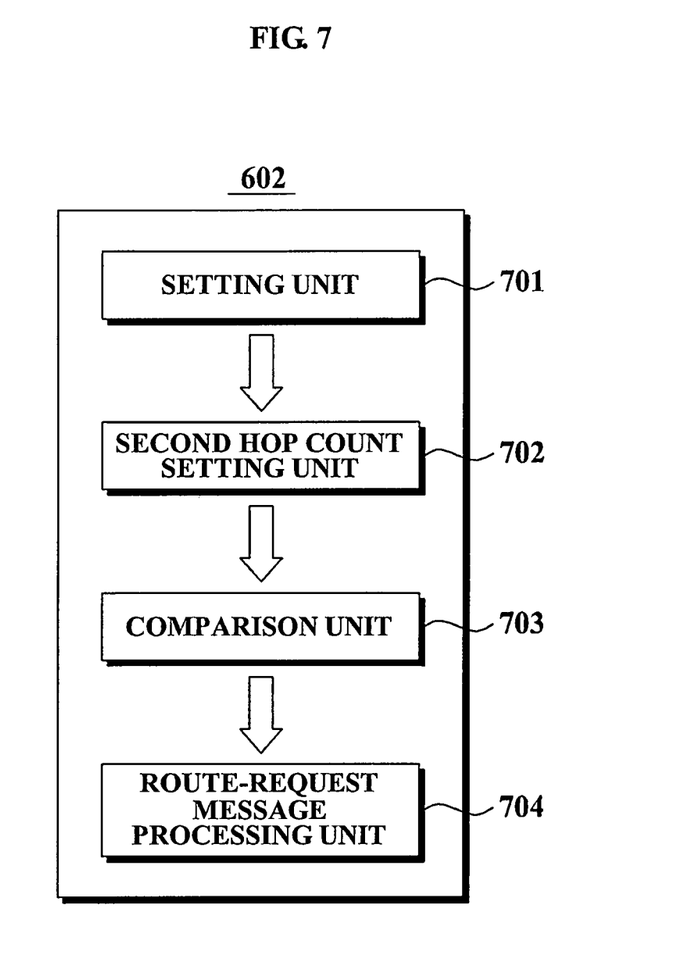
FIG. 7 is a block diagram illustrating a configuration of a neighbor node according to another exemplary embodiment of the present invention.

FIG. 7 is a block diagram illustrating a configuration of a neighbor node according to another exemplary embodiment of the present invention. In this instance, the at least one neighbor node 602 described in FIG. 6 may include a setting unit 701, a second hop count setting unit 702, a comparison unit 703, and a route-request message processing unit 704, as illustrated in FIG. 7.

The setting unit 701 sets a hop count and a signal strength included in a route-request message as a first hop count and a first signal strength, respectively. Specifically, the setting unit 701 extracts the hop count and the signal strength from the route-request message, received in the at least one neighbor node 602, and generates the first hop count and the first signal strength. The generated first hop count and first signal strength are used to determine a validity of the received route-request message.

The second hop count setting unit 702 sets a hop count of a previously received route-request message and a signal strength of the at least one neighbor node 602 as a second hop count and a second signal strength, respectively, when the route-request message is different from a first route-request message. Also, the second hop count setting unit 702 sets the second hop count to infinity when the route-request message is the first route-request message.

The comparison unit 703 confirms whether the first hop count is less than the second hop count and the first signal strength is less than the second signal strength included in the neighbor node.

In the current exemplary embodiment of the present invention, the signal strength measured in each node is a continuous number. Accordingly, for simplicity, the multi-hop cellular system 600 may be maintained by classifying a value of the signal strength into a plurality of levels. Specifically, a signal strength level corresponding to the signal strength of each node is generated, and the signal strength may be compared by transmitting the signal strength level instead of measuring the signal strength.

The route-request message processing unit 704 updates the second hop count and the first signal strength and re-broadcasts the route-request message, when the first hop count is less than the second hop count and the first signal strength is less than the second signal strength included in the neighbor node. Also, the route-request message processing unit 704 drops the route-request message, when the first hop count is greater than or equal to the second hop count and the first signal strength is greater than or equal to the second signal strength included in the neighbor node.

Specifically, when the first hop count is greater than or equal to the second hop count and the first signal strength is greater than or equal to the second signal strength, the route-request message is different from the route-request message of the source node. In this instance, the route-request message of the source node is first received in the at least one neighbor node 602. That is, when the first hop count is greater than or equal to the second hop count, the route-request message corresponds to a route-request message passing through even more nodes than a previously transmitted route-request message. Accordingly, the route-request message processing unit 704 drops the route-request message.

Also, when the first signal strength is greater than or equal to the second signal strength, the second signal strength, i.e. the signal strength of the at least one neighbor node 602, is less than or equal to the first signal strength, i.e. the signal strength of the source node 601. Accordingly, the route-request message processing unit 704 drops the route-request message.

As described above, only a neighbor node, which has a smaller hop count and a higher signal strength, re-broadcasts the route-request message. Accordingly, flooding of the multi-hop cellular system is reduced and performance is improved.

Figure 8:
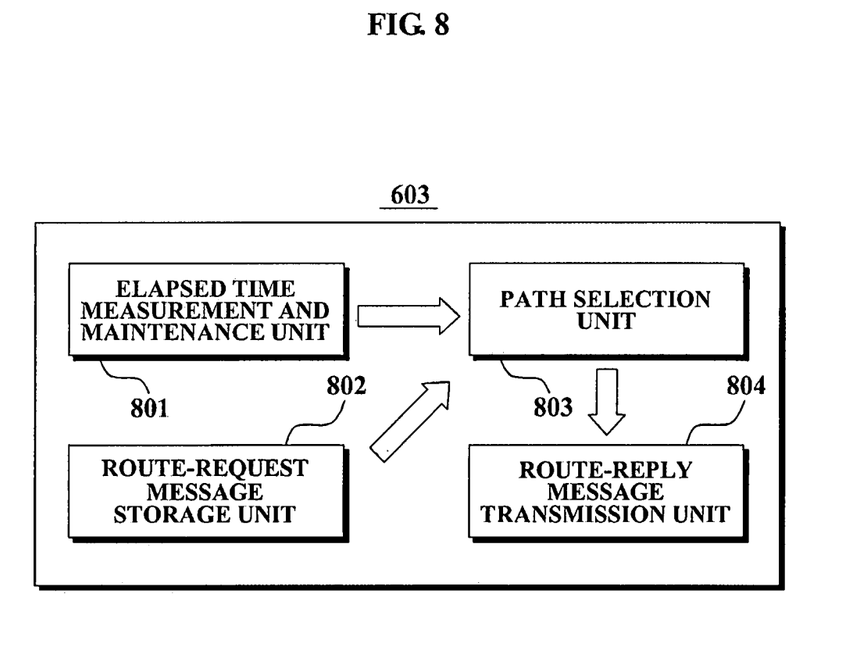
FIG. 8 is a block diagram illustrating a configuration of a base station according to another exemplary embodiment of the present invention.

FIG. 8 is a block diagram illustrating a configuration of a base station according to another exemplary embodiment of the present invention. In this instance, the base station 603 described in FIG. 6 may include an elapsed time measurement and maintenance unit 801, a route-request message storage unit 802, a path selection unit 803, and a route-reply message transmission unit 804, as illustrated in FIG. 8.

The elapsed time measurement and maintenance unit 801 measures and maintains an elapsed time with respect to a route-request message which is first transmitted, from among the route-request messages including a source address of a source node.

The route-request message storage unit 802 stores the first transmitted route-request message until the elapsed time exceeds a predetermined waiting time.

The path selection unit 803 selects an optimal path based on the stored route-request message, when the elapsed time exceeds the predetermined waiting time. In this instance, the path selection unit 803 may select the optimal path by comparing a hop count included in the route-request message.

The route-reply message transmission unit 804 transmits a route-reply message to the source node via the optimal path. In this instance, the route-reply message transmission unit 804 updates a routing table included in the base station via the optimal path, and may transmit the route-reply message to the optimal path. The routing table may include a destination address, a subsequent hop, and a most recent usage time. Also, the base station stores other paths in the routing table, and removes the path which is least recently used, based on the most recent usage time, when storage space with respect to the optimal path is insufficient.

As described above, the routing method in the multi-hop cellular system according to an exemplary embodiment of the present invention finds at least one path among a node, i.e. a mobile terminal, and a base station, based on a signal strength and a hop count, selects an optimal path of the at least one path in the base station, and drops a route-request message, which is transmitted by broadcasting, according to a predetermined standard based on the signal strength and the hop count. Thus, flooding is reduced.

Also, the routing apparatus and method in a multi-hop cellular system may have a different parameter value such as SNIR, or may select another path according to battery status by using a method of selecting a path among a plurality of paths to thereby obtain flexibility in selecting a performance metric.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an aspect of exemplary embodiments of the present invention, a routing apparatus and method in a multi-hop cellular system find at least one path between a node, i.e. a mobile terminal, and a base station based on a signal strength and a hop count, and select an optimal path of the at least one path in the base station.

Also, according to an aspect of exemplary embodiments of the present invention, a routing apparatus and method in a multi-hop cellular system drop a route-request message, which is transmitted by broadcasting, according to a predetermined standard based on signal strength and hop count to thereby reduce flooding.

Also, according to an aspect of exemplary embodiments of the present invention, a routing apparatus and method in a multi-hop cellular system may have a different parameter value such as SNIR, or may select another path according to a battery status by using a method of selecting a single path of a plurality of paths, to thereby obtain flexibility in selecting a performance metric.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A routing method in a multi-hop cellular system, the method comprising:
   maintaining a signal strength and a hop count in each node included in the multi-hop cellular system;
   receiving, in a neighbor node, a route-request message broadcast by a source node which includes the hop count and signal strength of the source node;
   dropping, by the neighbor node, the route-request message when the neighbor node does not have, respectively, a higher hop count and higher signal strength than the hop count and signal strength of the source node; and
   storing, in a base station, the route-request message which is received via the neighbor node, based on an elapsed time, or transmitting a route-reply message to the source node via an optimal path which is selected via the route-request message.

2. The method of claim 1, wherein:
   the signal strength of the source node indicates the strength of a signal communicated between the source node and a base station, and the signal strength of the neighbor node indicates the strength of a signal communicated between the neighbor node and the base station.

3. The method of claim 1, wherein the route-request message comprises a source address of the source node, an address of a previous node, the hop count, and the signal strength corresponding to a signal strength level from the source node to the base station.

4. The method of claim 1, wherein the storing or transmitting comprises:
measuring and maintaining the elapsed time with respect to the route-request message;
storing the route-request message until the elapsed time exceeds a predetermined waiting time; and
selecting the optimal path based on the stored route-request message, and
transmitting the route-reply message via the optimal path, when the elapsed time exceeds the predetermined waiting time.

5. The method of claim 4, further comprising updating a routing table, included in the base station, with information of the optimal path.

6. The method of claim 5, wherein:
the routing table comprises a destination address, a subsequent hop, and a most recent usage time, and
the base station stores other paths in the routing table and removes a path which is least recently used, based on the most recent usage time, when storage space with respect to the optimal path is insufficient.

7. The method of claim 1, further comprising re-broadcasting, by the neighbor node, the route-request message when the neighbor node respectively has a higher hop count and higher signal strength than the hop count and signal strength of the source node.

8. The method of claim 7, wherein the dropping or re-broadcasting of the route-requesting message comprises:
setting the hop count and the signal strength included in the route-request message as a first hop count and a first signal strength, respectively;
confirming whether the route-request message is a first route-request message transmitted from the source node;
setting a hop count of a previously received route-request message and a signal strength of the neighbor node as a second hop count and a second signal strength, respectively, when the route-request message is different from the first route-request message, and setting the second hop count to infinity when the route-request message is the same as the first route-request message;
confirming whether the first hop count is less than the second hop count and the first signal strength is less than the second signal strength included in the neighbor node; and
updating the second hop count and the first signal strength and re-broadcasting the route-request message after increasing and updating the first hop count, when the first hop count is less than the second hop count and the first signal strength is less than the second signal strength included in the neighbor node, and dropping the route-request message when the first hop count is greater than or equal to the second hop count and the first signal strength is greater than or equal to the second signal strength included in the neighbor node.

9. The method of claim 8, wherein the updating and re-broadcasting comprises:
updating the second hop count of the neighbor node with the first hop count;
updating the first signal strength of the route-request message with the second signal strength;
increasing and updating the first hop count of the route-request message; and
re-broadcasting the route-request message in which the signal strength and the hop count are updated.

10. A non transitory computer-readable recording medium having instructions, for controlling a base station and nodes included in a multi-hop cellular system, that implement a routing method, the instructions comprising:
a first set of instructions for controlling each node included in the multi-hop cellular system to maintain a signal strength and a hop count;
a second set of instructions for controlling a neighbor node to receive a route-request message broadcast by a source node which includes the hop count and signal strength of the source node;
a third set of instructions for controlling the neighbor node to drop the route-request message when the neighbor node does not have, respectively, a higher hop count and higher signal strength than the hop count and signal strength of the source node; and
a fourth set of instructions for controlling the base station to store the route-request message which is received via the neighbor node, based on an elapsed time, or to transmit a route-reply message to the source node via an optimal path which is selected via the route-request message.

11. The non-transitory computer-readable recording medium of claim 10, wherein the instructions further comprise a fifth set of instructions for controlling the neighbor node to re-broadcast the route-request message when the neighbor node respectively has a higher hop count and higher signal strength than the hop count and signal strength of the source node.

12. A multi-hop cellular system comprising:
a source node configured to broadcast a route-request message to a neighbor node which includes a hop count and signal strength of the source node;
the neighbor node configured to drop the route-request message when the neighbor node does not have, respectively, a higher hop count and higher signal strength than the hop count and signal strength of the source node; and
a base station configured to store the route-request message, which is received via the neighbor node, based on an elapsed time, or to transmit a route-reply message to the source node via an optimal path which is selected via the route-request message.

13. The system of claim 12, wherein:
the signal strength of the source node indicates the strength of a signal communicated between the source node and the base station, and
the signal strength of the neighbor node indicates the strength of a signal communicated between the neighbor node and the base station.

14. The system of claim 12, wherein the route-request message comprises a source address of the source node, an address of a previous node, the hop count, and a signal strength level from the source node to the base station.

15. The system of claim 12, wherein the base station comprises:
an elapsed time measurement and maintenance unit configured to measure and maintain the elapsed time with respect to the route-request message;
a route-request message storage unit configured to store the transmitted route-request message until the elapsed time exceeds a predetermined waiting time;

a path selection unit configured to select the optimal path based on the stored route-request message, when the elapsed time exceeds the predetermined waiting time; and a route-reply message transmission unit configured to transmit the route-reply message to the source node via the optimal path.

16. The system of claim 12, wherein the neighbor node is further configured to re-broadcast the route-request message when the neighbor node respectively has a higher hop count and higher signal strength than the hop count and signal strength of the source node.

17. The system of claim 16, wherein the neighbor node comprises:

a setting unit configured to set the hop count and the signal strength included in the route-request message as a first hop count and a first signal strength, respectively;

a second hop count setting unit configured to set a hop count of a previously received route-request message and a signal strength of the neighbor node as a second hop count and a second signal strength, respectively, when the route-request message is different from the previously received route-request message, and for setting the second hop count to infinity when the route-request message is the same as the previously received route-request message;

a comparison unit configured to confirm that the first hop count is greater than the second hop count and the first signal strength is less than the second signal strength; and a route-request message processing unit configured to update the first hop count and the first signal strength and re-broadcast the route-request message after updating the first hop count and the first signal strength, when the first hop count is less than the second hop count and the first signal strength is less than the second signal strength, and to drop the route-request message when the first hop count is greater than or equal to the second hop count and the first signal strength is greater than or equal to the second signal strength.

18. A node to reduce flooding in a multi-hop cellular system, the node comprising:

a receiver configured to receive, from a previous node, a route-request message that includes a signal strength based on a signal between the previous node and a base station and a hop count based on a hop count of the route-request message; and a route-request message processing unit configured to:
    drop the route-request message when the hop count included in the route-request message is not less than a hop count stored by the node and the signal strength included in the route-request message is not less than the signal strength of a signal between the node and the base station.

19. The node defined by claim 18, wherein the route-request message processing unit is further configured to re-broadcast the route-request message when the hop count included in the route-request message is less than the hop count stored by the node and the signal strength included in the route-request message is less than the signal strength of the signal between the node and the base station.

20. The node of claim 19, further comprising:

a setting unit configured to set a node signal strength based on the signal between the node and the base station in the multi-hop cellular system; and a comparison unit configured to compare the node signal strength to the signal strength of the received route-request message and to compare the node hop count with the hop count of the received route-request message, wherein the route-request processing unit determines whether to drop or re-broadcast the route-request message based on the comparison of the node signal strength and the signal strength of the received route-request messaged and based on the comparison of the node hop count and the hop count of the received-route request message.

21. The node of claim 20, wherein, when the route-request message processing unit determines to re-broadcast the route-request message, the route-request processing unit updates the route-request message by replacing the signal strength with the node signal strength and by increasing the hop count, and the route-request processing unit broadcasts the updated route-request message.

* * * * *